(12) United States Patent
Matange et al.

(10) Patent No.: US 9,582,911 B2
(45) Date of Patent: Feb. 28, 2017

(54) SYSTEMS AND METHODS FOR GRAPH GENERATION

(71) Applicant: SAS INSTITUTE INC., Cary, NC (US)

(72) Inventors: Sanjay Matange, Cary, NC (US); Jyoti Yakowenko, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/538,652

(22) Filed: Nov. 11, 2014

(65) Prior Publication Data

US 2015/0243059 A1   Aug. 27, 2015

Related U.S. Application Data

(60) Provisional application No. 61/945,572, filed on Feb. 27, 2014.

(51) Int. Cl.
*G06T 11/20* (2006.01)
*G06Q 30/00* (2012.01)

(52) U.S. Cl.
CPC ............ *G06T 11/206* (2013.01); *G06Q 30/00* (2013.01)

(58) Field of Classification Search
None
See application file for complete search history.

(56) References Cited

U.S. PATENT DOCUMENTS

| | | |
|---|---|---|
| 2,588,386 A | 3/1952 | Hubbard et al. |
| 2,973,140 A | 2/1961 | Katz |
| 3,359,897 A | 12/1967 | Harte |
| 4,418,390 A | 11/1983 | Smith et al. |
| 5,461,708 A | 10/1995 | Kahn |
| 5,611,034 A | 3/1997 | Makita |
| 5,764,239 A | 6/1998 | Misue et al. |
| 5,883,623 A | 3/1999 | Cseri |
| 6,390,508 B2 | 5/2002 | Levine |
| 6,490,566 B1 | 12/2002 | Schmidt |
| 7,667,582 B1 | 2/2010 | Waldorf |
| 2001/0014184 A1* | 8/2001 | Bubie ............... G06F 17/217 382/293 |
| 2005/0035967 A1 | 2/2005 | Joffrain et al. |
| 2012/0198390 A1 | 8/2012 | Bogusky et al. |

FOREIGN PATENT DOCUMENTS

EP    0 576 119 A2    12/1993

OTHER PUBLICATIONS

SAS Institute, Inc., JMP User's Guide, Version 2.0, (Sep. 1989), 589 pages.*

(Continued)

*Primary Examiner* — Zhengxi Liu
(74) *Attorney, Agent, or Firm* — Kilpatrick Townsend & Stockton LLP

(57) ABSTRACT

Systems and methods for generating one or more graphs corresponding to a data set are included. A computing system may receive user input data indicating a data set, the data set including one or more variables. Variable selection data indicating a subset of the one or more variables included in the data set may be obtained for the data set. An electronic representation of a graph selection structure may be generated based on the variable selection data. One or more graphs may be generated using the graph selection structure.

36 Claims, 9 Drawing Sheets

(56) References Cited

OTHER PUBLICATIONS

SAS Institute Inc. 2012. SAS, Virtual Analytics 6.1: User's Guide. Cary, NC: SAS Institute Inc. Selected pages.*

Alan Henry, "How to Choose the Best Chart for Your Data", May 11, 2012, retrieved from http://lifehacker.com/5909501/how-to-choose-the-best-chart-for-your-data on Jul. 29, 2016.*

Best, Al M. and David Morganstein, "Statistics Programs Designed for the Macintosh: Data Desk, Exstatix, Fastat, JMP, Stat View II, and SuperANOVA", *The American Statistician*, vol. 45, No. 4 (Nov. 1991), pp. 318-337.

Borland International, "Building Graphs." Chapter 13 in: *Quatrro Pro Version 4: User Guide* (1992), pp. 343-404.

Create a Graph. [online]. NCES, Dec. 14, 2006 [retrieved on Oct. 20, 2014]. Retrieved from the Internet: <URL: http://nces.ed.gov/NCESKIDS/createagraph/default.aspx>, 1 page, plus publication addendum from the Internet: <URL: www.archive.org>.

International Business Machines Corporation, *Programming: GDDM Programming Guide*, Version 2 (May 1991), 323 pages.

Landau, Ted, "JMP 2.0: For the most innovative, versatile approach to statistical analysis, no other package matches JMP", *MacUser* (Mar. 1992), 2 pages.

Lee, et al., "Using SASjCALC® Software to Complement SASjSTAT® SOFTWARE", *SUGI 17 : Proceedings of the Seventeenth Annual SAS Users Group International Conference* (Apr. 12-15, 1992), pp. 1429-1438.

SAS Institute, Inc.. "Now You Can JMP to the Right Conclusions"; Product Brochure (Sep. 1989), 8 pages.

SAS Institute, Inc.. "Statistical Visualization Product Announced for the Apple Macintosh"; *SAS Communications* vol. 15, No. 1 (Third Quarter, 1989), pp. 3-6, plus cover page.

Spindler, Gregg A. and Kalman J. Gyimesi, "Using Statistical Visualization as a Tool in Continuous Process Improvement", *Proceedings of the Third Annual. NorthEast SAS Users Group Conference* (Nov. 11-13, 1990), pp. 225-229.

* cited by examiner

| | 0N | 1N | 2N | 3N | 4N |
|---|---|---|---|---|---|
| 0C | 0N-0C NONE | 1N-0C HistogramBox | 2N-0C SCATTER 2CellScatterHist | 3N-0C ScatterMatrix ComparativeHist | 4N-0C ScatterMatrix ComparativeHist |
| 1C | 0N-1C FreqPlot | 1N-1C BarChart BoxPlot | 2N-1C GroupedScatter MultiResBar MultiResBox | 3N-1C MultiResBar MultiResBox GrpdScatterMtx | 4N-1C MultiResBar MultiResBox GrpdScatterMtx 1D-Lat0 |
| 2C | 0N-2C GrpdFreqPlot | 1N-2C GroupBarChart GroupBoxPlot | 2N-2C 1DLat2ResBar 1DLat2ResBox 1DLatOfGrpSca | 3N-2C 1DLatOf3ResBar 1DLatOf3ResBox | 4N-2C 1DLatOf4ResBar 1DLatOf4ResBox |
| 3C | 0N-3C 1DLatGrpFrqPlt | 1N-3C 1DLatGrpBarCht 1DLatGrpBoxPlt | 2N-3C 2DLat2ResBar 2DLat2ResBox 2DLatOfGrpSca | 3N-3C 2DLatOf3ResBar 2DLatOf3ResBox | 4N-2C 2DLatOf4ResBar 2DLatOf4ResBox |
| 4C | 0N-4C 2DLatGrpFrqPlt | 1N-4C 2DLatGrpBarCht 2DLatGrpBoxPlt | 2N-4C NONE | 3N-4C NONE | 4N-4C NONE |

FIG. 8

SYSTEMS AND METHODS FOR GRAPH GENERATION

CROSS-REFERENCE TO RELATED APPLICATIONS

The present disclosure claims priority to U.S. Provisional Application No. 61/945,572 filed Feb. 27, 2014 and titled "AutoChart," the entirety of which is incorporated herein by reference.

TECHNICAL FIELD

The present disclosure generally relates to computer-implemented systems and methods for generating a large number of graphs related to a data set.

BACKGROUND

Graphs are used to present data sets in many fields, for example, statistical analysis. With large volumes of data, it can be challenging for a data analyst to determine which types of graphs and variables are needed. Additionally, creating a multitude of graphs can be time intensive.

SUMMARY

In accordance with the teachings provided herein, systems and methods for automated generation of graphs related to a data set are provided.

For example, a computer-program product tangibly embodied in a non-transitory machine-readable storage medium is provided that includes instructions configured to be executed to cause a data processing apparatus to receive, from a user, user input data indicating a data set, the data set including one or more variables, each variable of the one or more variables being associated with variable metadata. The computer-program product further includes instructions configured to be executed to cause the data processing apparatus to obtain variable selection data for the data set. Variable selection data indicates a subset of the one or more variables included in the data set. The instructions may further include instructions that cause the data processing apparatus to generate an electronic representation of a graph selection structure based on the variable selection data, the graph selection structure indicating a set of graph types that are compatible with the variable selection data. The instructions may further include instructions that cause the data processing apparatus to generate one or more graphs of the set of graph types using the graph selection structure.

In another example, a computer-implemented method is provided that includes receiving, from a user, user input data indicating a data set, the data set including one or more variables, each variable of the one or more variables being associated with variable metadata. The computer-implemented method further includes obtaining variable selection data for the data set. Variable selection data indicates a subset of the one or more variables included in the data set. The computer-implemented method further includes generating an electronic representation of a graph selection structure based on the variable selection data, the graph selection structure indicating a set of graph types that are compatible with the variable selection data. The computer-implemented method further includes generating one or more graphs of the set of graph types using the graph selection structure.

In another example, a system is provided that includes a processor and a non-transitory computer-readable storage medium including instructions configured to be executed that, when executed on the processor, cause the processor to perform operations. The operations include receiving, from a user, user input data indicating a data set, the data set including one or more variables, each variable of the one or more variables being associated with variable metadata. The operations further include obtaining variable selection data for the data set. Variable selection data indicates a subset of the one or more variables included in the data set. The operations further include generating an electronic representation of a graph selection structure based on the variable selection data, the graph selection structure indicating a set of graph types that are compatible with the variable selection data. The operations further include generating one or more graphs of the set of graph types using the graph selection structure.

BRIEF DESCRIPTION OF THE DRAWINGS

FIG. 8 illustrates an example of a graph selection structure that can be used to generate one or more graphs related to a data set.

Like reference numbers and designations in the various drawings indicate like elements.

DETAILED DESCRIPTION

Certain aspects of the disclosed subject matter relate to techniques for bulk generation of graphs based on variables selected by a user from a data set within a graphics application. Heuristics may be used to create charts including, but not limited to, univariate and bivariate graphs, graphs with group classification, and other unique graphs. The combination of graph types generated may be based on variable types and other metadata. Many possible combinations of user-selected variables may be used to generate graphs that can provide an analyst some insight into the data set. The generated graph(s) may be saved in the system. The user can select any graph that is of interest to her, and further customize the graph. The user's variable selections or graph interactions may be tracked to determine future variables of interest or future graph types to be generated. The system is also designed to learn user preferences for a customized experience.

Information received for statistical analysis may include a large volume of data, sometimes organized into multiple data sets having hundreds of columns, and thousands or millions of observations, or more. Often, before starting an analysis, an analyst may want graphical views of the data, for example, to ascertain the various types of correlations that may exist between variables of the data set. Some trends, associations, or dis-associations can be visually discerned in the data through the use of graphs. These visual representations may lead the analyst or statistician toward a particular analysis that needs to be conducted. With large volumes of data, however, it can be challenging for an analyst to decide which graphs she may need or may prove useful. Additionally, creating multiple graphs even with a graphics tool can take hours or days, where each graph has to be individually constructed. Analysts often do not know that a particular graph would be useful without seeing it, yet may not have the time or resources to generate a large number of graphs to look over.

In one example, a user can select a data set to be visualized. The variables of the data set may be provided to the user, along with metadata such as a variable name or a variable type (e.g., discrete or continuous). The user can utilize a graphical interface, for example, to select one or more variables of a data set that is of interest to the user. The user can further select, using the graphical interface for example, a variable type for a variable. The user can further select, using the graphical interface for example, one or more graph types to be generated. A list, table, mapping, matrix, or other suitable structure can be used to document a number of potential graph types that can be generated. Based on the user's variable and graph type selections and the organizational structure that indicates the number of potential graph types, multiple graphs may be generated and provided to the user.

Figure 1:
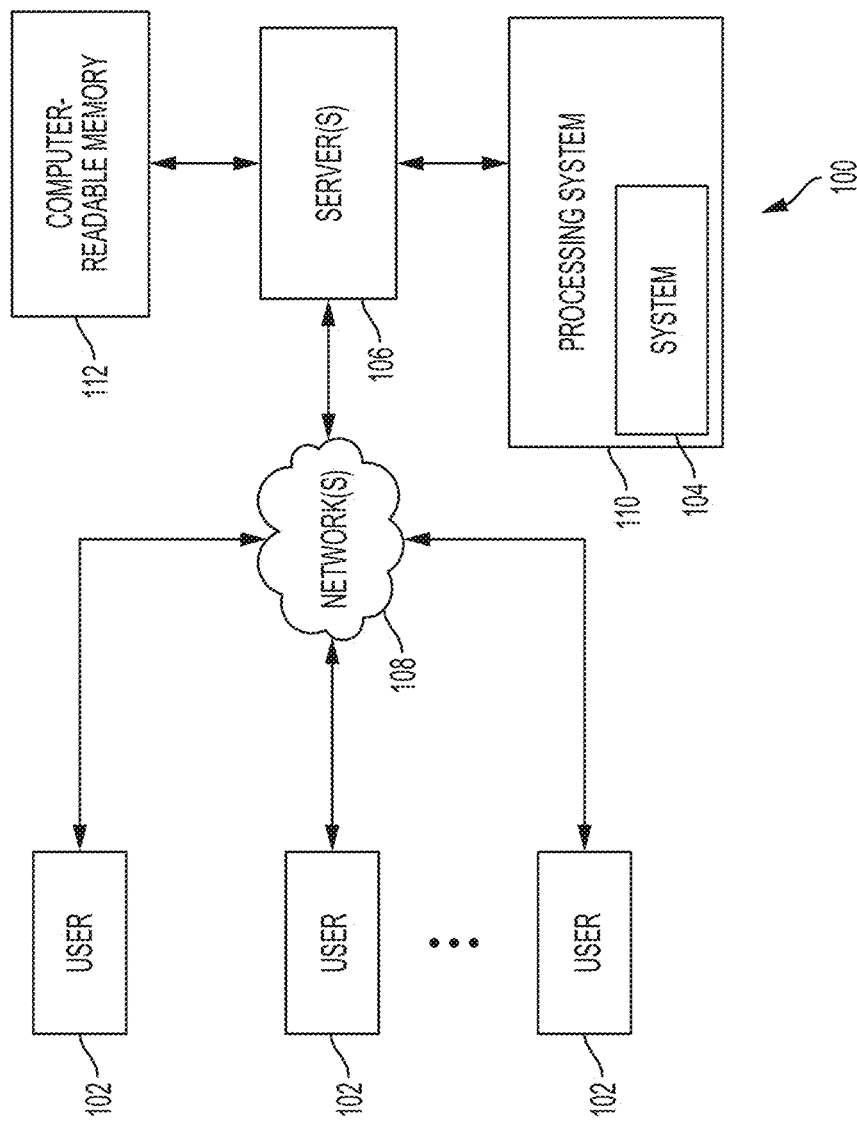
FIG. 1 illustrates a block diagram of an example of a computer-implemented environment for automated generation of one or more graphs related to a data set.

FIG. 1 illustrates a block diagram of an example of a computer-implemented environment 100 for generating one or more graphs related to a data set. Users 102 can interact with a system 104 hosted on one or more servers 106 through one or more networks 108. The system 104 can contain software operations or routines. The users 102 can interact with the system 104 through a number of ways, such as over networks 108. Servers 106, accessible through the networks 108, can host system 104. The system 104 can also be provided on a stand-alone computer for access by a user.

In one example, the environment 100 may include a stand-alone computer architecture where a processing system 110 (e.g., one or more computer processors) includes the system 104 being executed on it. The processing system 110 has access to a computer-readable memory 112.

In one example, the environment 100 may include a client-server architecture. Users 102 may utilize a PC to access servers 106 running a system 104 on a processing system 110 via networks 108. The servers 106 may access a computer-readable memory 112.

Figure 2:
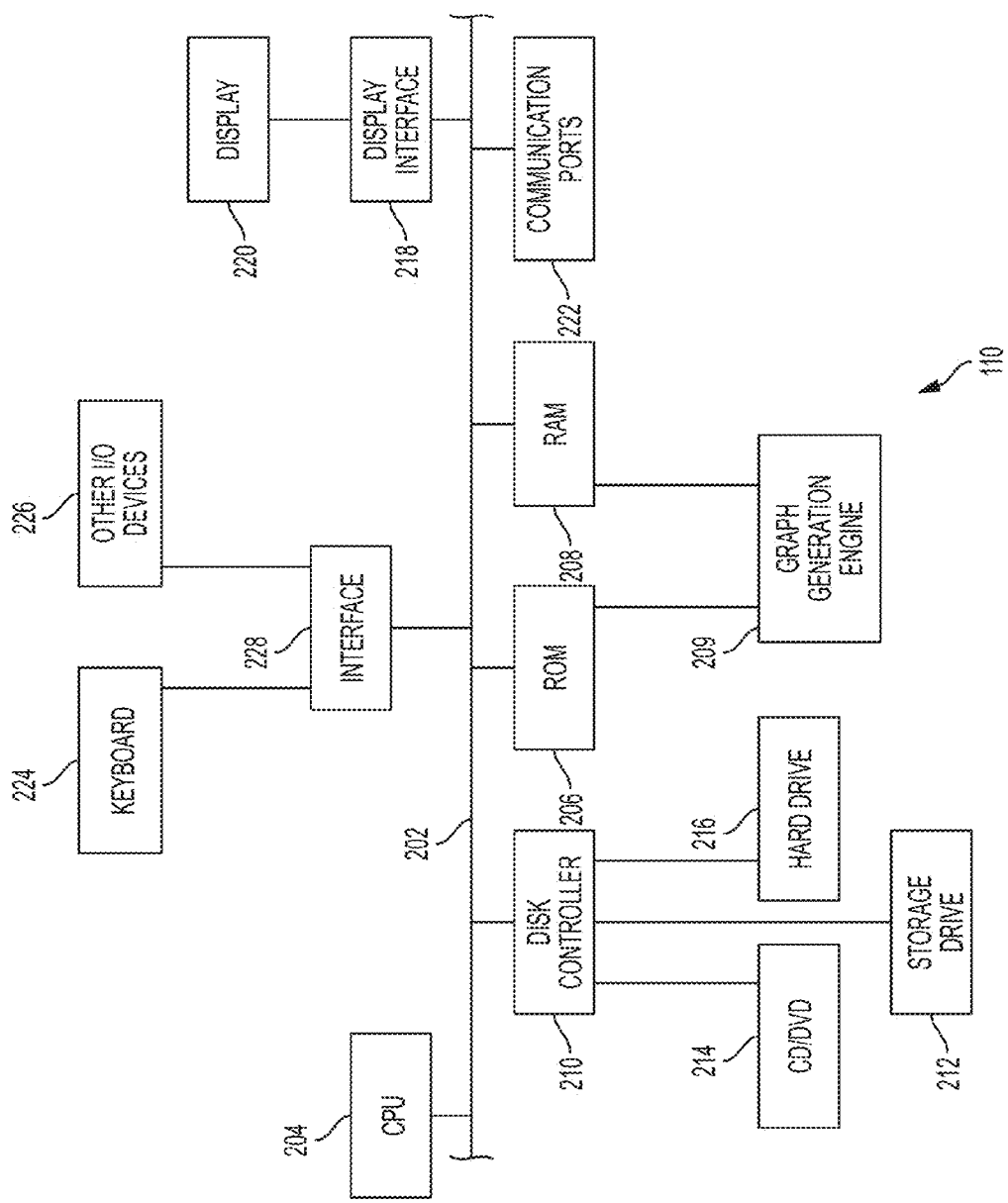
FIG. 2 illustrates a block diagram of an example of a processing system of FIG. 1 for generating, by a graph generation engine, one or more graphs related to a data set.

FIG. 2 illustrates a block diagram of an example of a processing system of FIG. 1 for generating one or more graphs related to a data set. A bus 202 may interconnect the other illustrated components of processing system 110. Central processing unit (CPU) 204 (e.g., one or more computer processors) may perform calculations and logic operations used to execute a program. A processor-readable storage medium, such as read-only memory (ROM) 206 and random access memory (RAM) 208, may be in communication with the CPU 204 and may contain one or more programming instructions. Optionally, program instructions may be stored on a computer-readable storage medium, such as a magnetic disk, optical disk, recordable memory device, flash memory, or other physical storage medium. Computer instructions may also be communicated via a communications transmission, data stream, or a modulated carrier wave. In one example, program instructions implementing graph generation engine 209, as described further in this description, may be stored on storage drive 212, hard drive 216, read only memory (ROM) 206, random access memory (RAM) 208, or may exist as a stand-alone service external to the stand-alone computer architecture.

A disk controller 210 can interface one or more optional disk drives to the bus 202. These disk drives may be external or internal floppy disk drives such as storage drive 212, external or internal CD-ROM, CD-R, CD-RW, or DVD drives 214, or external or internal hard drive 216. As indicated previously, these various disk drives and disk controllers are optional devices.

A display interface 218 may permit information from the bus 202 to be displayed on a display 220 in audio, graphic, or alphanumeric format. Communication with external devices may optionally occur using various communication ports 222. In addition to the standard computer-type components, the hardware may also include data input devices, such as a keyboard 224, or other input/output devices 226, such as a microphone, remote control, touchpad, keypad, stylus, motion, or gesture sensor, location sensor, still or video camera, pointer, mouse or joystick, which can obtain information from bus 202 via interface 228.

Figure 3:
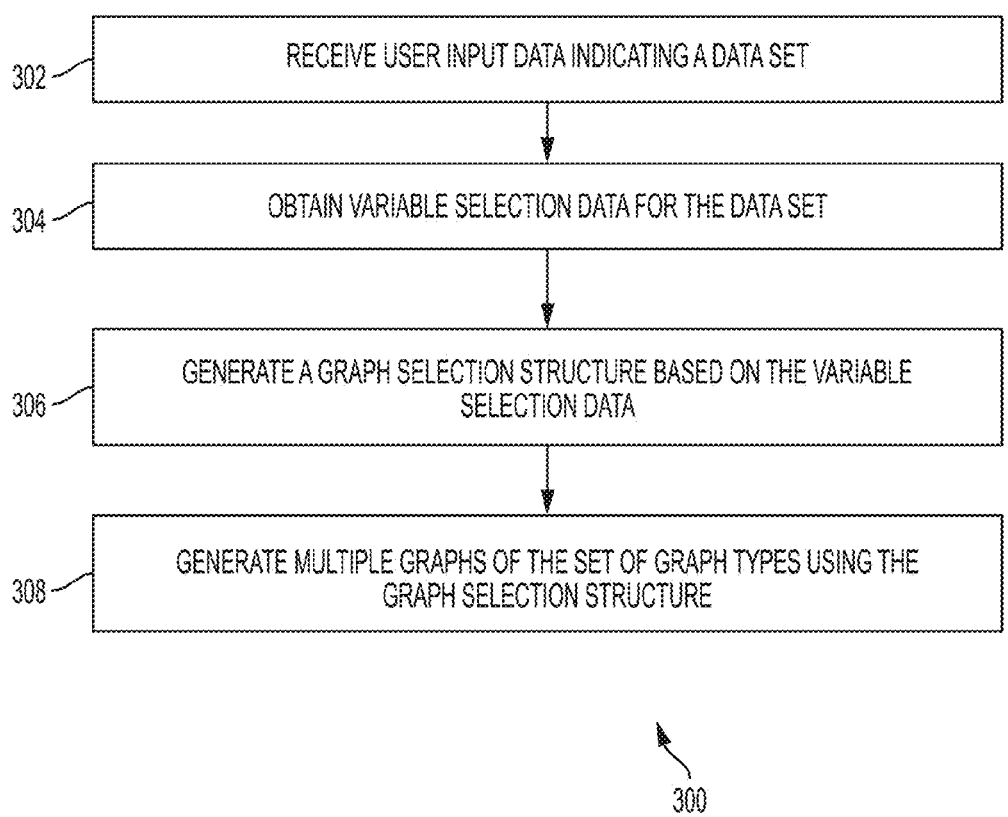
FIG. 3 illustrates an example of a flow diagram for generating, by a graph generation engine, one or more graphs related to a data set.

FIG. 3 illustrates an example of a flow diagram 300 for generating, by a graph generation engine (e.g., the graph generation engine 209 of FIG. 2), one or more graphs related to a data set. The flow diagram 300 can begin at block 302 where the graph generation engine 209 may receive user input data indicating a data set. For example a graphical user interface may be provided to enable a user interact with, for example, a drop down menu from which to select a particular data set from a number of data sets. As another example, a particular data set or data set location may be received from a user that indicates the particular data set to analyze. Any suitable method for receiving user selection information indicating a data set can be utilized.

At block 304, graph generation engine 209 obtains variable selection data for the data set. In one example, the graph generation engine 209 may obtain variable selection data by parsing the data set to determine one or more variables from the data set to be included in the variable selection data. For example, the graph generation engine 209 may determine a set of all variables from the data set. In another example, the graph generation engine 209 may determine a subset of the variables from the data set. The subset of variables may be determined using information pertaining to user-selected variables from similar, previously-processed data sets. For example, a user may have selected a particular variable (e.g. "age") over a threshold number of times in the past or more often than other variables (e.g., during graph generation for a number of previously-processed data sets). From this information, the graph generation engine 209 may determine that the particular variable (e.g., age) may be included in the set of variables independent of user interaction.

In one non-limiting example, a set of the variables in the data set can be presented to a user, for example, through the utilization of a graphical interface. Additionally, the graphical interface may be utilized to present metadata related to an individual variable (e.g., a number of times the variable has been selected by the user in the past). One or more variables may be selected via the graphical interface. The graph generation engine 209 may obtain variable selection data by receiving the one or more variable user selections. These user-selected variables can be included in the variable selection data to be utilized by the graph generation engine 209 to generate one or more graphs.

In another example, one or more variables from past graph generations may be used to generate current graphs. A user may exhibit a pattern of selecting certain variables repeatedly over time with repeated usage of the system. These user-selections may be tracked and, in some cases, previous user-selections may be used by the graph generation engine 209 to generate current graphs. In another example, a user analyzes data sets having variables that include "systolic" and "diastolic." Further, through the analysis of various previously-processed data sets, it may be determined that the user often (e.g., over a threshold number of times) selects these variables. Given this information, the variables "systolic" and "diastolic" may be automatically selected by the graph generation engine 209 to be included in the obtained variable selection data for the data set at block 304. As an additional, non-limiting example, a user can select, or otherwise indicate, one or more variables that the user wishes to be selected by default. In such cases, the default variables (e.g., variable preference information) may be used to automatically select a variable to be included in the variable selection data when the variable is present in the data set.

As an additional, non-limiting example, a user may define a variable prioritization scheme. The variable prioritization scheme may indicate one or more variables to be included in the variable selection data and an order such variables are to be included in the variable selection data. This user-define variable prioritization scheme may be utilized to select one or more variables to be included in the variable selection data.

At block 306, graph generation engine 209 may generate a graph selection structure based on the variable selection data obtained at block 304. The generated graph selection structure may be further based on a pre-defined graph selection structure. Alternatively, the graph generation engine 209 may utilize a pre-defined graph selection structure without regard to the variable selection data. A graph selection structure may be a list, a table, a mapping, a matrix, or any suitable single or multi-dimensional structure that may be used to document a number of potential graph types that can be generated from the data set. In at least one example, each entry in the graph selection structure can have one or more corresponding graph types. A graph type may include, but is not limited to, a univariate graph type, a bivariate graph type, a grouped graph type, or an advanced graph type. A univariate graph type indicates a type of graph in which only one variable is charted (e.g., histograms with normal density curve, frequency plots). A bivariate graph type indicates a type of graph in which two variables are charted (e.g., category-response type bar charts, box plots, X-Y scatter plots). A grouped graph type indicates a type of graph where a number of unique variable values that are less than a threshold number are used as classifiers, where the threshold number used for classification may be predefined or user-defined. An advanced graph type indicates graphs that depict associations between variables in the data set. For example, advanced graphs may include, but are not limited to, class panels, scatter plot matrices, comparative histograms, multi-response bar charts, multi-cell graphs, histograms with boxes, time series plots and class panel of histograms.

At block 308, multiple graphs of the set of graph types can be generated based on the graph selection structure generated at block 306. For example, the graph selection structure can be traversed to determine an order in which to generate graphs of the set of graph types. An example traversal of a graph selection structure is discussed below with respect to FIG. 9. As the graph selection structure is traversed, one or more graphs having a graph type associated with various entries in the graph selection structure may be generated.

Figure 4:
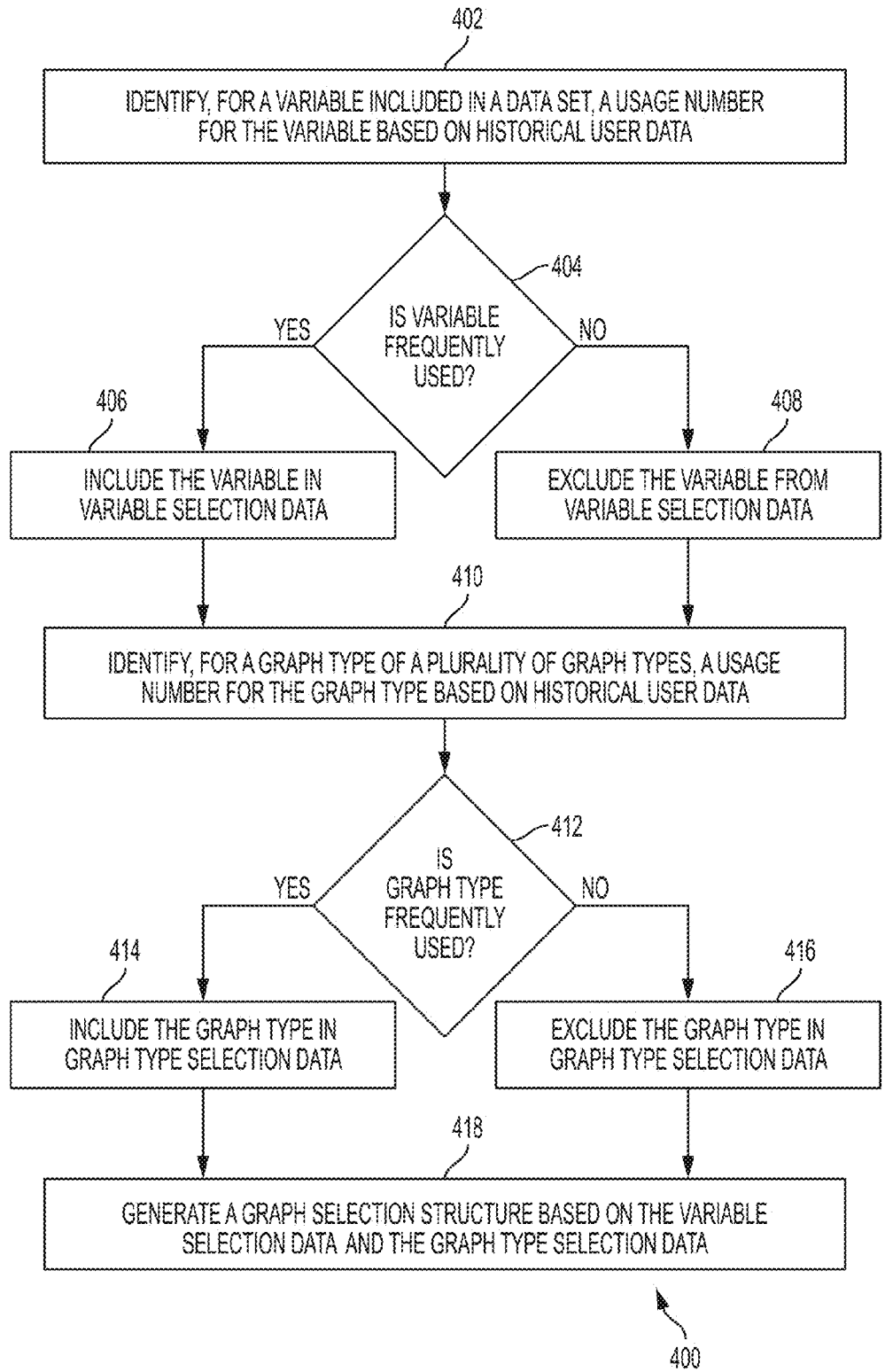
FIG. 4 illustrates another example of a flow diagram for generating, by a graph generation engine, one or more graphs related to a data set.

FIG. 4 illustrates another example of a flow diagram 400 for generating, by a graph generation engine (e.g., graph generation engine 209), one or more graphs related to a data set. The flow diagram 400 can begin at block 402 where graph generation engine 209 identifies, for a variable included in a data set, a usage number for the variable based on historical user data. The historical user data can be data associated with one or more users and indicate variables selected by the one or more users in the past. As a non-limiting example, historical user data can include information related to a particular user's selections (e.g., variable selections) with respect to graphs generated by the user in the past. The graph generation engine 209 can, for example, calculate how often a particular variable (e.g., "systolic") has been selected by the user in past graph generations. In this manner, the graph generation engine 209 may obtain a variable usage number for one or more variables in the data set. In another example, the graph generation engine 209 may obtain such variable usage numbers from stored data, or data calculated by a remote engine.

In another non-limiting example, historical user data can include selections (e.g., variable selections) made by users other than the current user, with respect to graphs generated by the other users in the past. The graph generation engine 209 may, for example, calculate how often a particular variable (e.g., "systolic") has been selected by the other users in past graph generations. In this manner, the graph generation engine 209 may obtain a variable usage number for one or more variables in the data set. In another example, the graph generation engine 209 may obtain such variable usage numbers from stored data, or data calculated by a remote engine.

At decision block 404, the variable usage number obtained at block 402 may be compared to usage numbers of other variables in order to determine whether the variable usage number indicates that the corresponding variable is one that is frequently used (e.g., the variable usage number is greater than usage numbers for all other variables or the variable usage number is greater than other usage numbers for other variables). If the variable usage number indicates that the variable is one that is frequently used, then the flow may proceed to block 406 where the variable may be included in variable selection data (e.g., a set of selected variables). Otherwise, if the usage number does not indicate that the variable is one that is frequently used, as compared to usage numbers of other variables, then the flow may proceed to block 408 where the variable may be excluded from the variable selection data.

Alternatively, at decision block 404, the variable usage number obtained in block 402 may be compared to a threshold value (e.g., a predefined or user-defined threshold) to determine if the variable is frequently used (e.g., the usage number is greater than the threshold value). If the variable usage number exceeds the threshold value, then the flow may proceed to block 406 where the variable may be included in variable selection data (e.g., a set of selected variables). Otherwise, if the usage number does not exceed the threshold value, then the flow may proceed to block 408 where the variable may be excluded from the variable selection data.

At block 410, the graph generation engine 209 identifies, for a particular graph type of multiple graph types, a usage number for the graph type based on historical user data. Similar to the example given above with respect to block 402, historical user data may include graph type selections of graphs generated in the past by one or more users. The one or more users may include the current user or users other than the current user. The usage number can correspond to a number of times that the user(s) generated a graph of a particular graph type. It should be understood that although usage numbers have been described as a count (e.g., a whole number), percentages, ratios, fractions, or other suitable methods for indicating a discrete amount or a comparative amount may be used.

At decision block 412, the graph type usage number obtained in block 410 is compared to usage numbers of other graph types in order to determine whether the graph type usage number indicates that the corresponding graph type is one that is frequently used (e.g., the graph type usage number is greater than usage numbers for all other graph types or the graph type usage number is greater than usage numbers for a corresponding set of graph types). If the graph type usage number indicates that the graph is one that is frequently used, then the flow may proceed to block 414 where the graph type may be included in graph type selection data (e.g., a set of selected graph types). Otherwise, if the usage number does not indicate that the graph type is one that is frequently used, as compared to usage numbers of other graph types, then the flow may proceed to block 408 where the graph type may be excluded from the graph type selection data.

Alternatively, at decision block 412, a graph type usage number obtained in block 410 may be compared to a threshold value. If the graph type usage number exceeds the threshold value, then the flow may proceed to block 414 where the graph type may be included in graph type selection data (e.g., a set of potential graph types). Otherwise, if the graph type usage number does not exceed the threshold value, then the flow may proceed to block 416 where the graph type may be excluded from the graph type selection data.

At block 418, a graph selection structure is generated based on the variable selection data and, in this case, the graph type selection data. The generated graph selection structure may be further based on a pre-defined graph selection structure. For example, graph types may be added or subtracted to the pre-defined graph selection structure based on the variable selection data. Alternatively, the graph generation engine 209 may utilize a pre-defined graph selection structure without regard to the variable selection data. For example, a table may be generated with entries corresponding to the graph types indicated in the graph type selection data. The variable selection data may be used to further determine what particular graph types may be compatible to generate given the variables selected and the graph type selection data. For example, a particular variable may be pre-defined as, or previously determined to be, suitable for use in generating a particular graph of the graph types included in the graph type selection data. Thus, a graph selection structure may be generated without current user input, but rather, utilizing historical user data to select variables and graph types.

Figure 5:
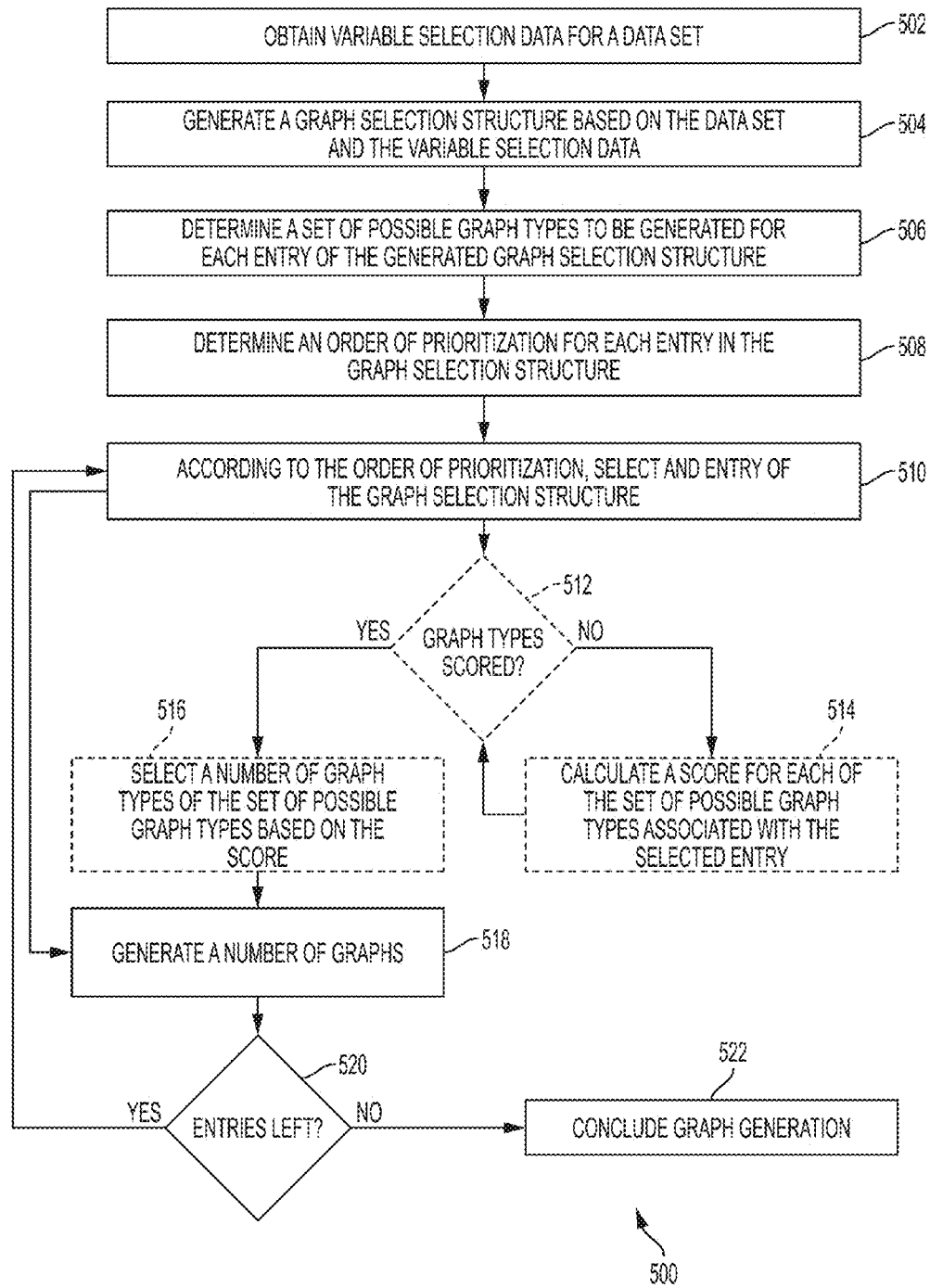
FIG. 5 illustrates a further example of a flow diagram for generating, by a graph generation engine, one or more graphs related to a data set

FIG. 5 illustrates a further example of a flow diagram 500 for generating, by a graph generation engine (e.g., the graph generation engine 209 of FIG. 2), one or more graphs related to a data set. The flow diagram 500 may begin at block 502, where variable selection data is obtained for a data set. As described above, obtained variable selection data may include user-specified variable selections or variable selections determined from historical user data.

At block 504, a graph selection structure is generated based on the variable selection data. As described above, the generated graph selection structure may be further based on a pre-defined graph selection structure. For example, graph types may be added or subtracted to the pre-defined graph selection structure based on the variable selection data. Alternatively, the graph generation engine 209 may utilize a pre-defined graph selection structure without regard to the variable selection data. The graph selection structure may include graph types that are compatible with the variable selection data as well as graph types that are incompatible with the variable selection data. Alternatively, if the variable selection data includes only one variable, then the graph selection structure may not include graph types that require more than one variable.

At block 506, a set of possible graph types to be generated for each entry of the graph selection structure are determined. A graph generation engine (e.g., the graph generation engine 209 of FIG. 2) may determine one or more corresponding graph types to associate with each entry of the graph selection structure. In some cases, graph types may be grouped and associated with the same entry as a mechanism for indicating that the graph types have similar prioritization. For example, graph types that have substantially similar generation requirements (e.g., number of calculations, overall time to generate), similar variables, or similar numbers of variables may be grouped in one entry of the graph selection structure. Thus, the graphs associated with the same entry of the graph selection structure may have similar computational requirements.

At block 508, an order of prioritization for each entry in the graph selection structure may be determined. The order may be predefined or user-defined. The order of prioritization may be related to a particular traversal pattern of the graph selection structure. For example, if the graph selection structure includes a list of graph types, one potential order of prioritization includes a traversal that starts with the top-most entry and sequentially traverses the list from top to bottom. As a further example, if the graph selection structure includes a table, one particular order of prioritization may include a traversal pattern of the table that starts with the top-left-most entry and traverses the table from left to right through the rows, and from top to bottom through the columns (e.g., R1C1, R1C2, R1C3, R1C2, R2C2, R3C3, R1C4, etc.).

At block 510, according to the order of prioritization determined from block 508, an entry of the graph selection structure is selected based on the order of prioritization determined at block 508.

In some examples (e.g., where a number of possible graphs to be generated is higher than a threshold number), the flow may proceed to decision block 512 where a determination may be made regarding whether the graph types associated with the entry have been scored. If the graph types have not been scored, the flow may proceed to block 514 where a score for each of the set of possible graph types associated with the selected entry may be scored. For example, suppose an entry is associated with graph types A, B, and C. Each of A, B, and C may be scored, for example, based on a computational cost associated with generating a graph corresponding to the graph type for the data set. In other examples, scores may be based on various factors, including, but not limited to, at least one of an overall time to generate a graph of the graph type, historical user data indicating past graph type selections (e.g., of the current user or a group of users), or a determination of a degree of information communicated by a particular graph type. Once the graph types are scored, the flow may return to decision block 512.

In a use case in which the graph types have been scored, the flow may proceed to block 516 where a number of graph types of the set of possible graph types are selected based on the score. In one example, the highest scored graph type will be selected. As a further example, multiple graphs may be selected (e.g., top five highest scored graph types) based on the score.

It should be understood that blocks 512-516 are optional and the flow may alternatively proceed from block 510 to block 518 without traversing blocks 512-516.

At block 518, one or more graphs are generated (e.g., by the graph generation engine 209) based on the graph types selected at block 516 or, alternatively, based on the selected entry of the graph selection structure as determined at block 510. For example, if a highest scored graph type was selected at block 516, one or more graphs of that graph type can be generated at block 518. Similarly, if multiple graph types were selected based on their respective scores, one or more graphs of the multiple graph types may be generated at block 518. Alternatively, one or more graph types may be generated at block 518 based on the selected entry of the graph selection structure without regard to scoring.

At decision block 520, a graph generation engine (e.g., the graph generation engine 209 of FIG. 2) may determine whether there are any entries left in the graph selection structure. If additional entries are available, the flow may proceed back to block 510, where another entry of the graph selection structure is selected and blocks 512-520 are repeated. If no entries are left at decision block 520, then the flow may proceed to block 522 where graph generation can conclude. Though this example depicts the graph generation continuing until there are no entries left in the graph generation structure, the flow may conclude at any point in time (e.g., in response to a particular amount of time elapsing or upon user input indicating a halt).

Figure 6:
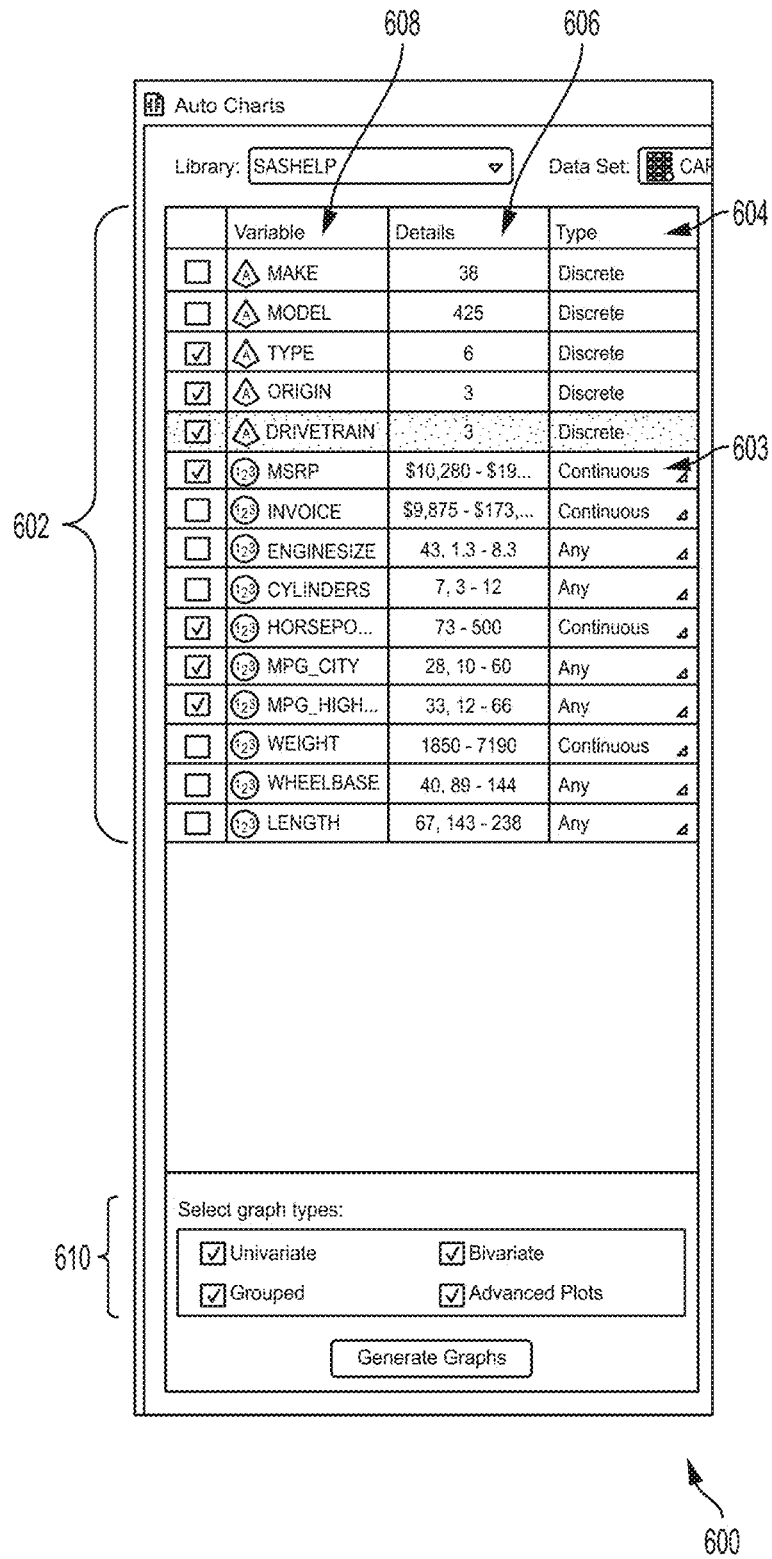
FIG. 6 illustrates an example of a graphical user interface that is configured to enable a user to select one or more variables in a data set that can be used by a graph generation engine to generate one or more graphs.

FIG. 6 illustrates an example of a graphical user interface 600 that is configured to enable a user to select one or more variables in a data set that can be used by a graph generation engine (e.g., the graph generation engine 209 of FIG. 2) to generate one or more graphs. In at least one example, one or more variables may be pre-selected by the system. Once a data set is selected by a user, a graphical interface (e.g., graphical interface 600) may be displayed to the user. The user may select one or more of variables 602 by, for example, checking a box next to a variable name. Alternatively, the system may pre-select the one or more variables 602 based on, for example, a determination that the one or more variables has been frequently used by the user in the past. A user may accept the selection of the pre-selected or user selected one or more variables, select additional variables, or may deselect (e.g., uncheck) any or all of the selected variables. FIG. 6 depicts variables 602 associated with a data set related to automobiles. Selected variables are indicated with the use of checkmarks.

Once the user selects a data set to be visualized, all, or some subset, of variables 602 of the data set may be displayed, along with the metadata such as the variable name and the variable type (e.g., "discrete," "continuous," "any"). As used herein, a "discrete variable" is one that may assume only a countable, and finite, number of values. As used herein, a "continuous variable" is one that may take an infinite number of possible values. Numeric variables with small number of unique values can be treated as either discrete or continuous and are, thus, considered to be of variable type "any." Metadata associated with variables 602, such as the type of data, the number of unique values or a numeric data range, and a variable name may be displayed in "Type" column 604, "Details" column 606, and "Variable" column 608, respectively.

Variables 602 may be selected, or may remain unselected, based on historical user data as described above. For example, historical data including the current user's past selections may be analyzed and it may be determined that the current user has selected each of the variables "type," "origin," "drivetrain," "horsepower," "mpg_city," and "mpg_highway" over a threshold number of times. Thus, graphical user interface 600, in some examples, may first be displayed with these variables checked. The user, at any point, may further select/deselect any of variables 602 listed, by checking or unchecking a corresponding checkbox. Though checkboxes are used in this example, any suitable method of selection may be used (e.g., radio buttons, highlighting, type in). Alternatively, graphical user interface 600 may first be displayed with none of variables 602 checked. The user may then check or uncheck any of the variables 602 listed in a similar manner as described above.

Additionally, graphical user interface 600 may be utilized to enable the user to select a variable type for each variable. For example, pull down menu 603 or another suitable method of selection may be utilized by the user to indicate a variable type. The variable type may include, but is not limited to, "discrete," "continuous," or "any."

Additionally, graphical user interface 600 may be configured to enable selection of one or more graph types. For example, area 610 may be provided in order to enable the user to select at least one of a univariate, a bivariate, a grouped, or an advanced graph type. One or more of the graph types in area 610 may be selected by default. Default selections may be based on historical user data or on user preference information (e.g., user specified preferred graph types). For example, if the user often (e.g., over a threshold number of times) has selected the univariate graph types (e.g., when analyzing data sets having to do with automobiles), the univariate graph type selection box may be checked. The user may, at any time, select/deselect any or all of the graph types.

In some implementations, variables 602 may each be associated with additional metadata including a number of specific roles that may be suitable for a variable to play in a graph. For example, "Make" and "Model," illustrated in graphical interface 600, may be suitable for use as classifiers, while variables like "MSRP" may be suitable for use as response variables. One or more of variables 602 may have a predefined association with a particular role associated with a particular graph or graph type. In some examples, the variable role may additionally, or alternatively, be displayed with the variables 602 via graphical user interface 600. Graphs may be generated automatically based on the variable selections and the type of graphs requested via graphical user interface 600.

Figure 7:
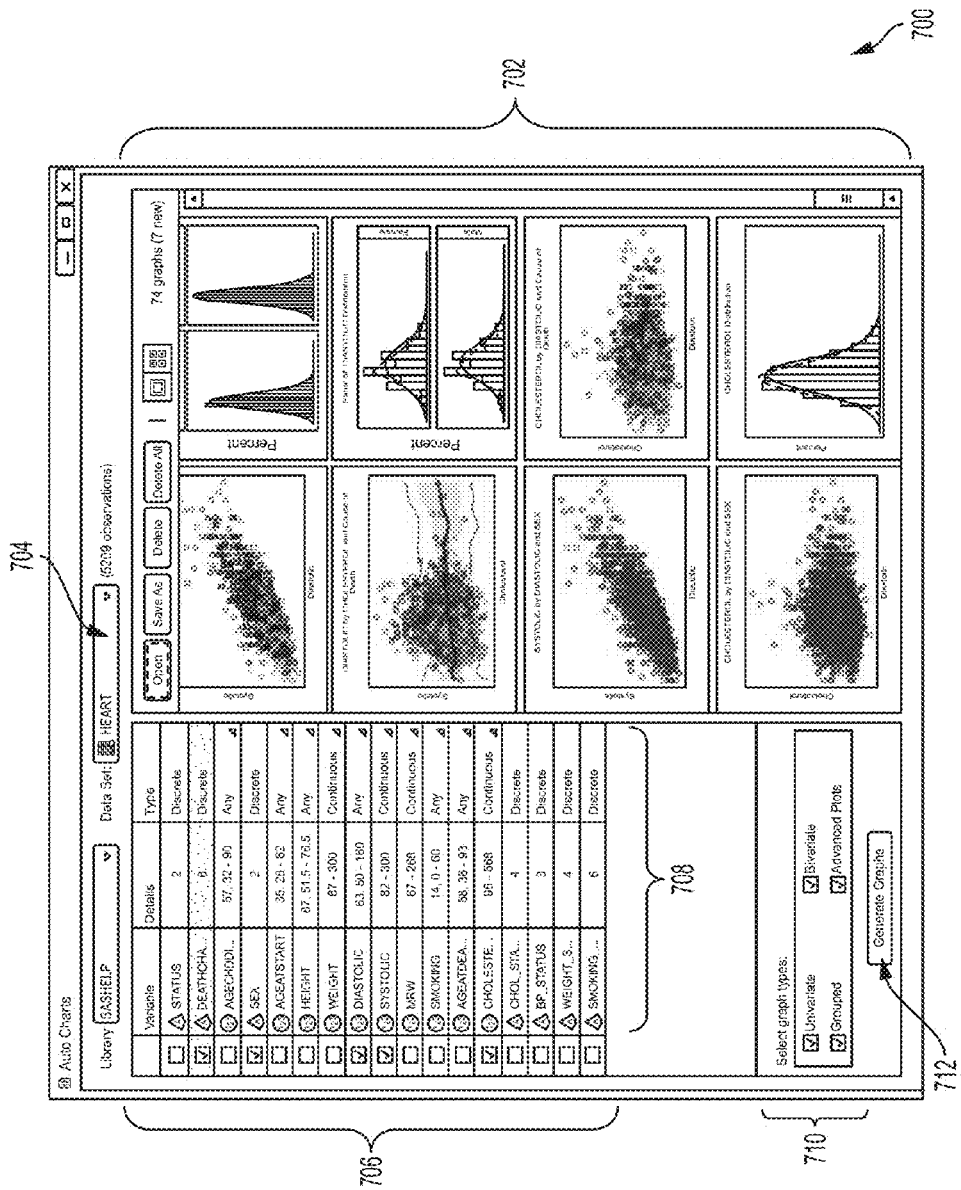
FIG. 7 illustrates an example of a graphical user interface that is configured to be utilized for providing one or more generated graphs.

FIG. 7 illustrates an example of a graphical user interface 700 for providing, by a graph generation engine (e.g., graph generation engine 209), a number of generated graphs.

All of the generated graphs, or a subset of the generated graphs, may be presented to the user (e.g., an analyst) as a gallery of graphs 702 for a particular data set as depicted in FIG. 7. The user can view the various graphs, individually, or as part of the gallery of graphs 702, in order to obtain a better understanding of the data set. The user may further customize any of the graphs into a graph useful for sharing with others. Additionally, the generated graphs may be made available to the user in multiple image formats (e.g., .png, .jpg) enabling the user to share the generated graphs with others. For example, the user may select a graph from the gallery. The graph may be displayed to the user. The user may modify the graph (e.g., changing colors, text, swapping variable axis orientation, etc.) in order to customize the graph as he or she sees fit.

In at least one embodiment, the data set is opened by selecting a data set via drop down menu 704. Upon data set selection, all the variables 706 may be displayed, along with variable metadata 708. For discrete variables, the number of unique values may be displayed, and for numeric variables, the data range(s) may be displayed. Time variables may also be identified.

Some of the variables may be preselected by the graph selection engine (e.g., the graph selection engine 209 of FIG. 2) based on the historical user data. Additionally, the user can select variables of interest from variables 602 using the checkboxes provided by graphical user interface 700, or through the use of user preference selections. Desired graph types can be requested via area 710. Some graph types may be selected by default.

Graphs are generated automatically upon, for example, selection of the "generate graphs" button 712. The graphs generated and displayed in a gallery of generated graphs 702 are based on the variable selections and the types of graphs requested. The graphical user interface 700 may indicate one or more graphs to be generated, and may additionally, or alternatively, provide a status bar to the user indicating a degree of progress in graph generation. The graph generation process can be interrupted or restarted at any time.

In at least some embodiments, generated graphs may be written to disk, or some other suitable storage system, as the graph generation process proceeds. Only a small icon image of the generated graph may be displayed in the gallery of generated graphs 702, thus conserving memory requirements. This allows the graph generation engine to create hundreds of graphs without running into memory issues. In some implementations, a user can edit and customize any graph as desired, by selecting a particular graph (e.g., from the gallery of generated graphs 702).

Oftentimes, it can be useful for an analyst or statistician to review all the graphs before they can decide to customize specific ones. One feature of the graph generation engine is to save all generated graphs (e.g., in a SAS Graph Designer meta file or image files).

Some features of the graph generation engine can enable the system to learn the user preferences (e.g., by prior use or metadata) and be able to add variable names to one or more role lists based on usage. A role list may be predefined or user-defined and may indicate one or more roles individually associated with one or more variable names. Role lists may also be user-editable. For example, variable names like "Gender," "Drug," etc. may be predefined to be included in the role list for a GROUP role. Names like "Height," "Weight," and "Revenue" can be included in a role list for a RESPONSE role or X or Y role. A user will be able to view the variable names in the lists for each role. The user can edit this list or remove variables from the list.

As the user continues to use the graph generation engine over time, the variable names used for different roles will be added to the role lists, along with usage counts. This will allow the graph generation engine to determine how certain variable names are used by a certain user.

The graph generation engine (e.g., graph generation engine 209) can provide a list of "Domains" that a user can select. The metadata can be customized based on domains and used accordingly. The application may be designed to be self-learning, adding to the metadata or graph rules based on user actions. Additional examples and details are provided below.

For example, every time a user assigns the variable named "Treatment" as the group variable on a box plot, an entry can be made into the metadata with a use count. The metadata table may already contain other variables as targets for the Group role with corresponding use-counts. The use-counts will decide if a certain variable (if selected) can be used as a group role.

It is also foreseen that, after extended usage, the metadata table may contain many variable names as targets for "Category," "Response," "Group," or "Analysis" roles. In this case, the graph generation engine may be able to create graphs even without the user selecting any variables at all using the information available in the metadata table. This can be done by preselecting variables in the variable list based on the metadata, so the initial state "selected" variable list will not be empty.

FIG. 8 illustrates an example of a graph selection structure 800 that can be used to generate one or more graphs related to a data set. In at least one embodiment, a table (e.g., graph selection structure 800) may be used as a graph selection structure. As a non-limiting example, the graph selection structure 800 may have one or more rows 802 and one or more columns 804, where each row corresponds to a numerical variable of a data set, and where each column corresponds to a categorical variable of a data set. In this example, though the rows are discussed as corresponding to numerical variables, and the columns are discussed as corresponding to categorical variables, it should be understood that the columns may correspond to numerical variables and the rows may correspond to categorical variables. In fact, in examples given herein, variables discussed as having a corresponding axis or orientation in a graph can correspond to any other suitable axis or orientation in the graph.

Specifically, graph selection structure 800 depicts a number of numeric variables along the horizontal axis (0N, 1N, up to 4N) and a number of categorical (or discrete) variables on the Y axis (0C, 1C, up to 4C). Though a four by four matrix is depicted, any number of rows and columns may be utilized. Each entry in graph selection structure 800 represents a case for creating graphs of one or more graph types having the corresponding number of numeric and categorical variables. For example, the entry in the top right represents the case of producing graphs with 4 numeric variables and 0 categorical variables. Some entries represent combinations for which the graph generation engine does not create graphs, for example, when the combination lacks useful application to the analysis of the data set.

Figure 9:
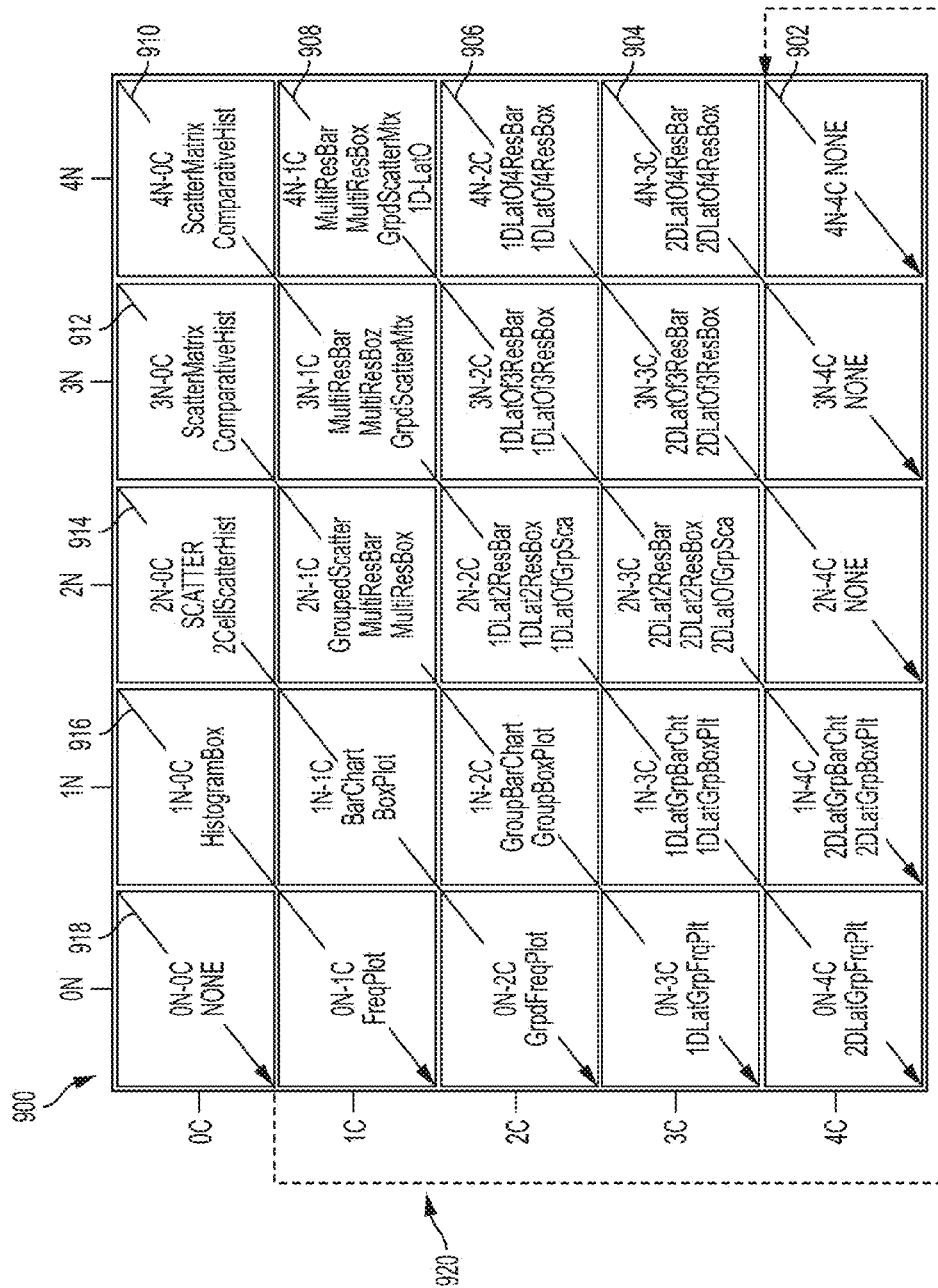
FIG. 9 illustrates an example of a traversal pattern of a graph selection structure by which one or more graphs related to a data set may be generated.

FIG. 9 illustrates an example of a traversal pattern 900 of a graph selection structure (e.g., the graph selection structure 800) by which one or more graphs related to a data set may be generated. Consider the case where the graph selection structure currently in use is identical to the graph selection structure 800, provided in FIG. 8.

Traversal arrows 902-918, in this example, guide the graph generation engine to create graphs of different complexities using graph generation structure 800. The graph generation engine may start traversing graph selection structure 800 as indicated by traversal arrow 902 starting with the entry indicated by the rectangle at coordinates (4N, 4C). As indicated by the graph selection structure 800, there are no graph types associated with the entry at coordinates (4N, 4C), thus, the entry will be skipped and the traversal continued as indicated by arrow 904 to the entry at coordinates (4N, 3C). The graph generation engine can create a graph from the type listed in that entry (e.g., a 2D Lattice of 4 response Bar Plots, a 2D Lattice of 4 Box plots). The entry at coordinates (3N, 4C) will be skipped as there are no graph types associated with the entry. The graph generation engine may then move along the traversal arrow 906 to the next entry (4N, 2C), and proceed down traversal arrow 1006 creating graphs for each entries 4N, 2C) and (3N-3C), respectively, and skipping entry (2N, 4C). The graph generation engine may continue on traversing the graph selection structure 800 sequentially as indicated by traversal arrows 908-918, creating graphs for entries having associated graph types and skipping entries that lack associated graph types. This zig-zag traversal of the graph selection structure can allow a mixture of graphs of different complexity to be generated.

The graph generation engine 209 may analyze each graph type from each entry. The graph generation engine may select entries from the graph selection structure corresponding to a particular number of variables (e.g., the number of user-selected variables). In some cases, there may not be many combinations at high complexities. Based on metadata associated with the variables, there may not be many candidate class classifiers (e.g., 1D or 2D). This can be restricted, for example, by the number of unique values associated with the variable. For example, months could be used as a group if needed (e.g., 12 unique values), but not as classifiers in 1D or 2D graphs. Even if it is possible to have more than one graph type for the entry, in a first traversal of the graph selection structure, only one graph may be generated for the entry. Multiple traversals of the graph selection structure may occur, as indicated by optional traversal line 920. On each traversal, for each entry, multiple graphs may be generated. The multiple traversals may be of the same traversal pattern, or may be different traversal patterns. It may not always be possible to have a graph generated from each entry of the graph selection structure. For example, some variables selected may not be suitable for the graph types indicated in the entry. In that case, the entry may be skipped.

Systems and methods according to some examples may include data transmissions conveyed via networks (e.g., local area network, wide area network, Internet, or combinations thereof, etc.), fiber optic medium, carrier waves, wireless networks, etc. for communication with one or more data processing devices. The data transmissions can carry any or all of the data disclosed herein that is provided to, or from, a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The system and method data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, removable memory, flat files, temporary memory, databases, programming data structures, programming variables, IF-THEN (or similar type) statement constructs, etc.). It is noted that data structures may describe formats for use in organizing and storing data in databases, programs, memory, or other computer-readable media for use by a computer program.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows and figures described and shown in this specification can be performed by one or more programmable processors executing one or more computer programs to perform functions by operating on input data and generating output.

Generally, a computer can also include, or be operatively coupled to receive data from or transfer data to, or both, one or more mass storage devices for storing data (e.g., magnetic, magneto optical disks, or optical disks). However, a computer need not have such devices. Moreover, a computer can be embedded in another device, (e.g., a mobile telephone, a personal digital assistant (PDA), a tablet, a mobile viewing device, a mobile audio player, a Global Positioning System (GPS) receiver), to name just a few. Computer-readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks; magneto optical disks; and CD ROM and DVD-ROM disks). The processor and the memory can be supplemented by, or incorporated in, special purpose logic circuitry.

The computer components, software modules, functions, data stores and data structures described herein may be connected directly or indirectly to each other in order to allow the flow of data needed for their operations. It is also noted that a module or processor includes, but is not limited to, a unit of code that performs a software operation, and can be implemented, for example, as a subroutine unit of code, or as a software function unit of code, or as an object (as in an object-oriented paradigm), or as an applet, or in a computer script language, or as another type of computer code. The software components or functionality may be located on a single computer or distributed across multiple computers depending upon the situation at hand.

The computer may include a programmable machine that performs high-speed processing of numbers, as well as of text, graphics, symbols, and sound. The computer can process, generate, or transform data. The computer includes a central processing unit that interprets and executes instructions; input devices, such as a keyboard, keypad, or a mouse, through which data and commands enter the computer; memory that enables the computer to store programs and data; and output devices, such as printers and display screens, that show the results after the computer has processed, generated, or transformed data.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products (i.e., one or more modules of computer program instructions encoded on a computer-readable medium for execution by, or to control the operation of, data processing apparatus). The computer-readable medium can be a machine-readable storage device, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question (e.g., code that constitutes processor firmware, a protocol stack, a graphical system, a database management system, an operating system, or a combination of one or more of them).

While this disclosure may contain many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be utilized. Moreover, the separation of various system components in the implementations described above should not be understood as requiring such separation in all implementations, and it should be understood that the described program components and systems can generally be integrated together in a single software or hardware product or packaged into multiple software or hardware products.

Some systems may use Hadoop@, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A computer-program product tangibly embodied in a non-transitory machine-readable storage medium, including instructions configured to be executed to cause a data processing apparatus to perform operations including:
   receiving input corresponding to determination of a data set, wherein the data set includes multiple variables;
   obtaining variable selection data for the data set, wherein the variable selection data identifies a plurality of selected variables included in the data set;
   generating an electronic representation of a graph selection structure, wherein the electronic representation of the graph selection structure comprises a plurality of graph selection entries, wherein:
      a first plurality of graph selection entries identify one or more single-variable graph types compatible with a single variable, and
      a second plurality of graph selection entries identify a plurality of multiple-variable graph types compatible with a plurality of variables;
   determining an order of prioritization to access each graph selection entry of the graph selection structure; and
   accessing each graph selection entry according to the order of prioritization to generate and display multiple graphs using the variable selection data, wherein accessing includes:
      selecting a set of compatible graph types for the graph selection entry; and
      generating a set of graphs corresponding to the selected set of compatible graph types for the graph selection entry, wherein generating the set of graphs includes:
         for graph selection entries that identify one or more single-variable graph types compatible with a single variable:
            generating, for each selected variable individually, one or more single-variable graphs corresponding to the selected set of compatible graphs types for the graph selection entry; and displaying, for each selected variable, the one or more single-variable graphs corresponding to the selected set of compatible graph types for the graph selection entry; and for graph selection entries that identify a plurality of multiple-variable graph types compatible with a plurality of variables:

generating, for each of a plurality of combinations of selected variables, a plurality of multiple-variable graphs corresponding to the selected set of compatible graphs types for the graph selection entry; and displaying, for each of the plurality of combinations of selected variables, the plurality of multiple-variable graphs corresponding to the selected set of compatible graph types for the graph selection entry.

2. The computer-program product of claim 1, wherein the graph selection structure is two-dimensional, wherein a first dimension of the graph selection structure is associated with a number of numeric variables of the multiple variables, wherein a second dimension of the graph selection structure is associated with a number of categorical variables of the multiple variables, and wherein each first dimension and second dimension pair of the graph selection structure is associated with a subset of graph types of the one or more single-variable graph types and the plurality of multiple-variable graph types.

3. The computer-program product of claim 1, wherein generating the electronic representation of the graph selection structure includes using a pre-defined graph selection structure.

4. The computer-program product of claim 1, wherein generating the electronic representation of the graph selection structure includes, for each entry of the graph selection structure, determining a set of possible graph types to be generated for the entry based on the variable selection data.

5. The computer-program product of claim 4, wherein accessing includes:

calculating a score for each of the compatible graph types, wherein the score is based on one or more variable types associated with the entry, wherein selecting the set of compatible graph types includes using the score, and wherein the set of compatible graph types are used in generating graphs.

6. The computer-program product of claim 1, wherein obtaining the variable selection data for the data set includes:

generating an interface for identifying the variable selection data; and receiving interface input corresponding to identification of the identified variable selection data.

7. The computer-program product of claim 1, wherein obtaining the variable selection data for the data set includes:

identifying, for each variable of the multiple variables included in the data set, a usage number based on historical user data; and determining the variable selection data based on the usage number of each variable.

8. The computer-program product of claim 1, wherein the operations further include:

identifying, for an individual variable of the multiple variables included in the data set, historical data of a user with respect to the individual variable; and determining a role for the individual variable with respect to at least one of the generated plurality of different graphs based on the historical data.

9. The computer-program product of claim 1, wherein the operations further include:

generating an interface for selecting one or more graph types of the set; and receiving graph type selection data corresponding to selection of a subset of the one or more single-variable graph types and the plurality of multiple-variable graph types, wherein generating the electronic representation of the graph selection structure includes using the graph type selection data.

10. The computer-program product of claim 1, wherein the operations further include:

identifying, for each graph type of the one or more single-variable graph types and the plurality of multiple-variable graph types, a usage number based on historical user data; and determining graph type selection data based on the usage number of each graph type, wherein generating the electronic representation of the graph selection structure includes using the determined graph type selection data.

11. The computer-program product of claim 1, wherein each variable of the multiple variables is associated with variable metadata, wherein the variable metadata includes at least one of a variable name, one or more variable values, and a variable type.

12. The computer-program product of claim 1, wherein the one or more single-variable graph types and the plurality of multiple-variable graph types includes at least one of a univariate type, a bivariate type, and a grouped type.

13. A computer-implemented method comprising:

receiving, by a computing device, input corresponding to determination of a data set, wherein the data set includes multiple variables;

obtaining, by the computing device, variable selection data for the data set, wherein the variable selection data identifies a plurality of selected variables included in the data set;

generating, by the computing device, an electronic representation of a graph selection structure, wherein the electronic representation of the graph selection structure comprises a plurality of graph selection entries, wherein:

a first plurality of graph selection entries identify one or more single-variable graph types compatible with a single variable, and a second plurality of graph selection entries identify a plurality of multiple-variable graph types compatible with a plurality of variables;

determining, by the computing device, an order of prioritization to access each graph selection entry of the graph selection structure; and accessing, by the computing device, each graph selection entry according to the order of prioritization to generate and display multiple graphs using the variable selection data, wherein accessing includes:

selecting, by the computing device, a set of compatible graph types for the graph selection entry; and generating, by the computing device, a set of graphs corresponding to the selected set of compatible graph types for the graph selection entry, wherein generating the set of graphs includes:

for graph selection entries that identify one or more single-variable graph types compatible with a single variable:
generating, for each selected variable individually, one or more single-variable graphs corresponding to the selected set of compatible graph types for the graph selection entry; and
displaying, for each selected variable, the one or more single-variable graphs corresponding to the selected set of compatible graph types for the graph selection entry; and
for graph selection entries that identify a plurality of multiple-variable graph types compatible with a plurality of variables:
generating, for each of a plurality of combinations of selected variables, a plurality of multiple-variable graphs corresponding to the selected set of compatible graph types for the graph selection entry; and
displaying, for each of the plurality of combinations of selected variables, the plurality of multiple-variable graphs corresponding to the selected set of compatible graph types for the graph selection entry.

14. The method of claim 13, wherein the graph selection structure is two-dimensional, wherein a first dimension of the graph selection structure is associated with a number of numeric variables of the multiple variables, wherein a second dimension of the graph selection structure is associated with a number of categorical variables of the multiple variables, and wherein each first dimension and second dimension pair of the graph selection structure is associated with a subset of graph types of the one or more single-variable graph types and the plurality of multiple-variable graph types.

15. The method of claim 13, wherein generating the electronic representation of the graph selection structure includes using a pre-defined graph selection structure.

16. The method of claim 13, wherein generating the electronic representation of the graph selection structure includes, for each entry in the graph selection structure, determining a set of possible graph types to be generated for the entry based on the variable selection data.

17. The method of claim 16, wherein accessing includes:
calculating a score for each of the compatible graph types, wherein the score is based on one or more variable types associated with the entry, wherein selecting the set of compatible graph types includes using the score, and wherein the set of compatible graph types are used in generating graphs.

18. The method of claim 13, wherein obtaining the variable selection data for the data set includes:
generating an interface for identifying the variable selection data; and
receiving interface input corresponding to identification of the identified variable selection data.

19. The method of claim 13, wherein obtaining the variable selection data for the data set includes:
identifying, for each variable of the multiple variables included in the data set, a usage number based on historical user data; and
determining the variable selection data based on the usage number of each variable.

20. The method of claim 13, further comprising:
identifying, for an individual variable of the multiple variables included in the data set, historical data of a user with respect to the individual variable; and
determining a role for the individual variable with respect to at least one of the generated plurality of different graphs based on the historical data.

21. The method of claim 13, further comprising:
generating an interface for selecting one or more graph types of the one or more single-variable graph types and the plurality of multiple-variable graph types; and
receiving graph type selection data corresponding to selection of a subset of the one or more single-variable graph types and the plurality of multiple-variable graph types, wherein generating the electronic representation of the graph selection structure includes using the graph type selection data.

22. The method of claim 13, further comprising:
identifying, for each graph type of the one or more single-variable graph types and the plurality of multiple-variable graph types, a usage number based on historical user data; and
determining graph type selection data based on the usage number of each graph type, wherein generating the electronic representation of the graph selection structure includes using the determined graph type selection data.

23. The method of claim 13, wherein each variable of the multiple variables is associated with variable metadata, wherein the variable metadata includes at least one of a variable name, one or more variable values, and a variable type.

24. The method of claim 13, wherein the one or more single-variable graph types and the plurality of multiple-variable graph types includes at least one of a univariate type, a bivariate type, and a grouped type.

25. A system, comprising:
a processor; and
a non-transitory computer-readable storage medium including instructions
configured to be executed that, when executed by the processor, cause the system to perform operations including:
receiving input corresponding to determination of a data set, wherein the data set includes multiple variables;
obtaining variable selection data for the data set, wherein the variable selection data identifies a plurality of selected variables included in the data set;
generating an electronic representation of a graph selection structure, wherein the electronic representation of the graph selection structure comprises a plurality of graph selection entries, wherein:
a first plurality of graph selection entries identify one or more single-variable graph types compatible with a single variable, and
a second plurality of graph selection entries identify a plurality of multiple-variable graph types compatible with a plurality of variables;
determining an order of prioritization to access each graph selection entry of the graph selection structure; and
accessing each graph selection entry according to the order of prioritization to generate and display multiple graphs using the variable selection data, wherein accessing includes:
selecting a set of compatible graph types for the graph selection entry; and generating a set of graphs corresponding to the selected set of compatible graph types for the graph selection entry, wherein generating the set of graphs includes:
    for graph selection entries that identify one or more single-variable graph types compatible with a single variable:
        generating, for each selected variable individually, one or more single-variable graphs corresponding to the selected set of compatible graph types for the graph selection entry; and
        displaying, for each selected variable, the one or more single-variable graphs corresponding to the selected set of compatible graph types for the graph selection entry; and
    for graph selection entries that identify a plurality of multiple-variable graph types compatible with a plurality of variables:
        generating, for each of a plurality of combinations of selected variables, a plurality of multiple-variable graphs corresponding to the selected set of compatible graphs types for the graph selection entry; and
        displaying, for each of the plurality of combinations of selected variables, the plurality of multiple-variable graphs corresponding to the selected set of compatible graph types for the graph selection entry.

26. The system of claim 25, wherein the graph selection structure is two-dimensional, wherein a first dimension of the graph selection structure is associated with a number of numeric variables of the multiple variables, wherein a second dimension of the graph selection structure is associated with a number of categorical variables of the multiple variables, and wherein each first dimension and second dimension pair of the graph selection structure is associated with a subset of graph types of the one or more single-variable graph types and the plurality of multiple-variable graph types.

27. The system of claim 25, wherein generating the electronic representation of the graph selection structure includes using a pre-defined graph selection structure.

28. The system of claim 25, wherein generating the electronic representation of the graph selection structure includes, for each entry in the graph selection structure, determining a set of possible graph types to be generated for the entry based on the variable selection data.

29. The system of claim 28, wherein accessing includes:
    calculating a score for each of the compatible graph types, wherein the score is based on one or more variable types associated with the entry, wherein selecting the set of compatible graph types includes using the score, and wherein the set of compatible graph types are used in generating graphs.

30. The system of claim 25, wherein obtaining the variable selection data for the data set includes:
    generating an interface for identifying the variable selection data; and
    receiving interface input corresponding to identification of the identified variable selection data.

31. The system of claim 25, wherein obtaining the variable selection data for the data set includes:
    identifying, for each variable of the multiple variables included in the data set, a usage number based on historical user data; and
    determining the variable selection data based on the usage number of each variable.

32. The system of claim 25 wherein the operations further include:
    identifying, for an individual variable of the multiple variables included in the data set, historical data of a user with respect to the individual variable; and
    determining a role for the individual variable with respect to at least one of the generated plurality of different graphs based on the historical data.

33. The system of claim 25, wherein the operations further include:
    generating an interface for selecting one or more graph types of the set; and
    receiving graph type selection data corresponding to selection of a subset of the one or more single-variable graph types and the plurality of multiple-variable graph types, wherein generating the electronic representation of the graph selection structure includes using the graph type selection data.

34. The system of claim 25, wherein the operations further include:
    identifying, for each graph type of the one or more single-variable graph types and the plurality of multiple-variable graph types, a usage number based on historical user data; and
    determining graph type selection data based on the usage number of each graph type, wherein generating the electronic representation of the graph selection structure includes using the determined graph type selection data.

35. The system of claim 25, wherein each variable of the multiple variables is associated with variable metadata, wherein the variable metadata includes at least one of a variable name, one or more variable values, and a variable type.

36. The system of claim 25, wherein the one or more single-variable graph types and the plurality of multiple-variable graph types includes at least one of a univariate type, a bivariate type, and a grouped type.

* * * * *